United States Patent
Stemmer et al.

(10) Patent No.: US 12,475,439 B2
(45) Date of Patent: Nov. 18, 2025

(54) ENHANCED SPATIAL AUDIO-BASED VIRTUAL SEATING ARRANGEMENTS

(71) Applicant: Intel Corporation, Santa Clara, CA (US)

(72) Inventors: Georg Stemmer, Munich (DE); Willem Beltman, West Linn, OR (US); Hector Cordourier Maruri, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 17/853,853

(22) Filed: Jun. 29, 2022

(65) Prior Publication Data

US 2022/0343289 A1   Oct. 27, 2022

(51) Int. Cl.
*G06Q 10/1093* (2023.01)
*G10L 15/20* (2006.01)

(52) U.S. Cl.
CPC .......... *G06Q 10/1095* (2013.01); *G10L 15/20* (2013.01)

(58) Field of Classification Search
CPC .................... G06Q 10/1095; G10L 15/20
See application file for complete search history.

(56) References Cited

U.S. PATENT DOCUMENTS

| | | | | |
|---|---|---|---|---|
| 2018/0027351 A1* | 1/2018 | Cartwright | .............. | H04M 3/56 381/303 |
| 2022/0150083 A1* | 5/2022 | Faulkner | ............. | H04L 65/1069 |

* cited by examiner

Primary Examiner — Bhavesh M Mehta
Assistant Examiner — Edward Tracy, Jr.
(74) *Attorney, Agent, or Firm* — Akona IP PC

(57) ABSTRACT

This disclosure describes systems, methods, and devices related to presenting video conferencing virtual seating arrangements. A method may include generating a first similarity score indicative of a first similarity between a first voice of a first virtual meeting user and a second voice of a second virtual meeting user; generating a second similarity score indicative of a second similarity between the first voice of the first virtual meeting user and a third voice of a third virtual meeting user; determining, based on the first similarity score and the second similarity score, a similarity loss for a virtual seating arrangement; determining that the similarity loss is a minimum similarity loss of respective similarity losses for different virtual seating arrangements; generating presentation data, for the virtual meeting, including virtual representations of the virtual meeting users arranged based on the virtual seating arrangement; and presenting the presentation data.

20 Claims, 9 Drawing Sheets

ENHANCED SPATIAL AUDIO-BASED VIRTUAL SEATING ARRANGEMENTS

TECHNICAL FIELD

This disclosure generally relates to systems and methods for video presentation and, more particularly, to virtual seating arrangements for meetings using spatial audio.

BACKGROUND

Users increasingly are using online video conferencing applications to collaborate with other users. Having to distinguish virtual meeting participants by their voice alone increases the overall cognitive load of a user, which can result in reduced ability to track meeting progress, and potentially a higher likelihood of user disengagement.

DETAILED DESCRIPTION

Figure 1:
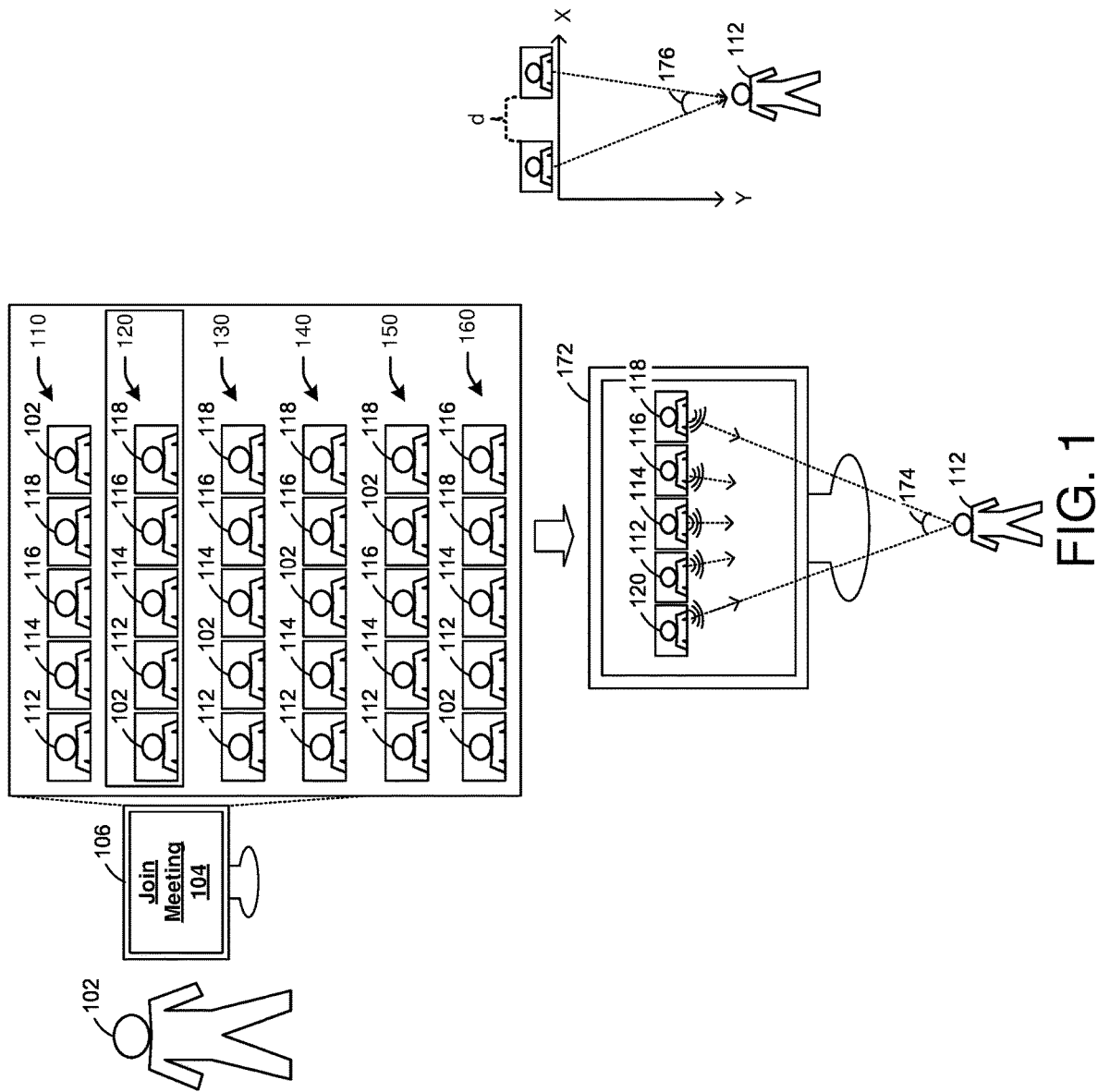
FIG. 1 illustrates an example generation of spatial audio-based virtual seating arrangements, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Compared to face-to-face meetings, remote gatherings come with specific challenges for the participants, especially in relatively large meetings (e.g., with five or more participants), when there is no transmission of video, or when some participants have switched off their camera. A particular challenge in larger meetings is to focus on a particular person while others are speaking at the same time. This phenomenon is known as the cocktail party effect. Having to distinguish participants by their voice alone increases the overall cognitive load of a user which can result in reduced ability to track meeting progress and potentially higher likelihood of disengagement.

One solution is to restrict and enforce meeting participation to only one person speaking at a time, but such is not always desirable or enforceable. Another solution is to improve the remote meeting experience with binaural audio. Each meeting participant may be assigned a location in a virtual, i.e., simulated, meeting room. The audio signals recorded at each participant's microphone are not simply mixed into a mono stream, as in some communication platforms, but the left and right stereo channel may be computed for each participant individually. The simulated audio signal depends on the virtual locations of all participants, taking account the listener's Head-Related Transfer Function (HRTF) and optional additional acoustic properties (e.g., reverberation of the virtual meeting room). Binaural audio creates a more immersive experience by enhancing the comprehension and reducing the cognitive effort associated with distinguishing overlapping speakers or conversation. However, the improvement of using binaural audio may be constrained by the number of meeting participants, as the angular difference between people sitting next to each other in the virtual meeting room decreases when the number of participants increases. Thus, the binaural audio may not provide a noticeably improved experience in many cases if the number of meeting participants is too large.

There is therefore a need for enhanced spatial audio-based virtual seating arrangements.

The cocktail party effect described above may not be limited to only spatial organization of sound; distinct acoustical properties of different speakers may aid in disambiguation of speaker signals. Accordingly, in one or more embodiments, the present disclosure provides techniques to generate and update a seating arrangement in a virtual meeting room (e.g., provided by a virtual meeting computer application) that ensures that meeting participants with very similar voices are not seated close to each other. In this manner, the binaural audio will help, even when the number of meeting participants grows to a large number, because the participants who sit next to each other will still be distinguishable by their voices. The present disclosure may result in a reduced cognitive load, and overall better experience by users who participate in remote meetings.

In one or more embodiments, the present disclosure provides a method for determining an optimal seating arrangement for a virtual meeting room. The virtual locations (e.g., where the participants are presented on a device display) according to the seating arrangement may be used to determine the individual binaural audio signals to be streamed to each participant during the meeting. In this manner, even when multiple participants have joined a virtual meeting from different physical locations, each participant will be presented with a seating arrangement in which the other participants are arranged on screen in a manner in which any two participants having voice similarities may be separated (e.g., not adjacent/next to one another), allowing for the spatial sound to be presented (e.g., using speakers) directionally as if coming from the respective virtual location of the participant speaking at a given time.

In one or more embodiments, when a user joins a virtual meeting, a computer system on which the virtual meeting application is running may determine whether a voice print of the user exists. For example, with user consent and in accordance with relevant laws, the computer system may record the user speaking to generate an audio recording to be used as a voice print for the user. User voice prints may be stored in a database on the computer system or remotely (e.g., in a cloud-based storage). When no voice print exists for the user, the user may be prompted to speak while being recorded to generate a voice print. When a voice print exists for the user, the computer system may retrieve the user's voice print from the database. When the user is the first user to join the meeting, no optimization may be needed. When the user joins a meeting which at least one other user already has joined, the computer system may compare the voice prints of the users to determine a similarity between each respective voice print. When two voice prints are similar, the computer system may generate a virtual seating arrangement in which the users of the two voice prints are not next to one another (e.g., another user may be positioned in between them, or the two users may be arranged at opposite sides of a display). For each user who joins the meeting, the arrangement may be updated so that when a user joins the meeting, the new arrangement may be presented.

In one or more embodiments, a voice print may be an x-vector embedding of a user's speech. The cosine similarity between the embedding vectors could be used as a similarity measure. The cosine similarity is defined by Equation (1) below for two embedding vectors A and B (from two different meeting participants A and B):

$$\text{cosine similarity}(A, B) = \frac{A \cdot B}{\|A\| \cdot \|B\|}. \quad (1)$$

Other similarity measures may be considered.

In one or more embodiments, the algorithm to determine the optimal seating position for user N works by trying out all possible seating positions for user N. If, besides the listener, there are already (N−1) persons are already present in the meeting, and the persons are to be seated with an equal distance, there are N possible seating positions for the new participant user N. When a new participant joins a meeting, the algorithm may determine a similarity loss for all possible seating arrangements based on the number of participants in the meeting. For each of the seating arrangements the algorithm computes an overall similarity loss, e.g., according to Equation (2) below:

$$\text{Similarity loss } f := \sum_{\substack{\text{all participants} \\ A}} \sum_{\substack{\text{all participants} \\ B \neq A}} \text{similarity}(A, B) \cdot \text{proximity}(A, B) \quad (2)$$

The similarity measure similarity(A, B) between two participants A and B is larger for more similar voices, e.g., the above-mentioned cosine similarity. The proximity should be larger the closer the participants are seated together, e.g., using the cosine of the difference of the angles in which speakers A and B are directed from the perspective of the listener. The algorithm decides the seating arrangement that minimizes the similarity loss.

A simple example implementation of the algorithm may include a meeting scenario with six total participants. Participant 1 views the other five participants in a remote meeting setting. In the example, the following cosine similarity matrix is assumed for the different participants is shown below in Table 1.

TABLE 1

Example Cosine Similarity Matrix for Participants:

|   | 2 | 3 | 4 | 5 | 6 |
|---|---|---|---|---|---|
| 2 | 1.0 | 0.1 | 0.2 | 0.3 | 0.2 |
| 3 | 0.1 | 1.0 | 0.3 | 0.2 | 0.2 |
| 4 | 0.2 | 0.3 | 1.0 | 0.2 | 0.9 |
| 5 | 0.3 | 0.2 | 0.2 | 1.0 | 0.3 |
| 6 | 0.2 | 0.2 | 0.9 | 0.3 | 1.0 |

For the five remote speakers in the example above, there are a total of 120 possible permutations, with some of them being mirror images of each other. The algorithm then calculates the loss function as outlined above, based on the cosine similarity for the participants' voices, and the proximity function to capture spatial separation.

In one or more embodiments, an input to the algorithm may be the total angle over which all participants are arranged. For example, if the total maximum angle is 90 degrees, each participant is separated by 22.5 degrees (e.g., for N participants, the total angle divided by N−1 spaces between the N participants). The proximity loss function in this case is always positive as the cosine of the angle varies between 0 and 1, so the total loss function is a positive number. Therefore, there may be two minima in the loss function, for the permutations [6-3-2-5-4], and [4-5-2-3-6]. These are minima are mirror images of each other, demonstrating that the method separates participants 6 and 4, with similar voice characteristics, and places them farthest apart to improve comprehension and reduce fatigue.

In another example, using the same cosine similarity matrix for the participants, the total maximum angle is 180 degrees. This means each participant is separated by 45 degrees, and one participant is located to the left on the display, and another all the way on the right on the display. The proximity loss function in this case can be negative, as the cosine of the angle varies between −1 and 1. In this situation, there are four minima in the loss function, for the permutations [6-3-2-5-4], [4-5-2-3-6], [6-2-3-5-4] and [4-5-3-2-6]. These pairs are again mirror images of each other. This demonstrates that the method separates participants 6 and 4, with similar voice characteristics, and places them farthest apart to improve comprehension and reduce fatigue.

In another example, the computer system may implement boundary conditions for the permutations. Boundary conditions may be introduced, for example to represent the initial order when a new participant enters the meeting. Rather than reshuffling all participants based on all possible permutations, the algorithm may evaluate the permutations where the new participant is inserted into the existing order of participants.

In one or more embodiments, the virtual seating arrangement may be optimized even when there are enough meeting participants to necessitate multiple rows of presented participants. For example, a display device or application window for the virtual meeting may only be able to present a certain number of virtual representations of the meeting participants in a single row before running out of space. To add more participants, additional rows may be presented. The algorithm may optimize when using elevations (e.g., multiple rows of participants) by applying the same equations above, and accounting for combinations of participant arrangements in multiple dimensions (e.g., left, right, above, and below) to avoid any two participants with similar voices being presented adjacent or otherwise too near to one another in a virtual meeting application.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an example generation of spatial audio-based virtual seating arrangements, in accordance with one or more example embodiments of the present disclosure.

Referring to FIG. 1, a user 102 may join a virtual meeting 104 by using a device 106. Because the virtual meeting 104 may have multiple users participating, the device 106 may present a virtual seating arrangement of the users in attendance based on the similarities between user voices so that for any user, the sounds from each user in attendance may be clearly distinguishable. For example, a first virtual seating arrangement 110 may include a virtual representation (e.g., digital image representing) a user 112, a virtual representation of a user 114, a virtual representation of a user 116, a virtual representation of a user 118, a virtual representation of the user 102 (and so on, depending on the total number of users in attendance). Other virtual seating arrangements with the same users may be possible. For example, a virtual seating arrangement 120 may include the same users in a different seating order. Another virtual seating arrangement 130 may include the same users in a different seating order. Another virtual seating arrangement 140 may include the same users in a different seating order. Another virtual seating arrangement 150 may include the same users in a different seating order. Another virtual seating arrangement 160 may include the same users in a different seating order. The number of seating arrangements may depend on the number of users (and corresponding permutations), and the number of rows and columns of virtual representations to present (e.g., which may depend on display size, application window size, user setting, or the like).

Still referring to FIG. 1, the virtual seating arrangement 120 may be the optimal virtual seating arrangement. To identify the optimal virtual seating arrangement from among the options based on the number of users in the virtual meeting, the respective cosine similarities between users may be determined using Equation (1) above. Based on the proximity between users, which may be based on the distance between the right-most and left-most virtual representations (e.g., between the user 102 and the user 118 in the virtual seating arrangement 120), the proximity may be determined as the total angle (e.g., explained further below) between the right- and left-most representations and N–1 users for N users. Using Equation (2), loss functions may be determined for the respective virtual seating arrangements 110, 120, 130, 140, 150, and 160. The virtual seating arrangement with the lowest loss function may be selected for presentation. As shown in FIG. 1, the virtual seating arrangement with the lowest loss function is the virtual seating arrangement 120. Based on the selection of the virtual seating arrangement with the lowest loss function, that virtual seating arrangement may be presented to any of the users in the virtual meeting 104 (e.g., to user 112 of device 172).

Still referring to FIG. 1, it is shown that, respective to the device 172 presenting the virtual seating arrangement 120, the audio presented using binaural audio may depend on the respective locations of the virtual representations of the users as arranged in the virtual seating arrangement 120. Because the virtual meeting 104 may use spatial audio, the audio output of the device 172 may originate from the user who is speaking at a given time, resulting in the audio arriving at an angle with respect to the user 112. The distance d between the left-most and the right-most virtual representations of users may correspond to a maximum total angle used (e.g., the longer the distance along the x-axis, the larger the angle, with a maximum angle approaching 180 degrees). As shown, angle 174 may represent the maximum angle of the audio (e.g., from the left-most user to the right-most user). Based on the distance d between respective virtual representations of users, their audio outputs may correspond to an angle 176. The larger the distance d between users (or between the left- and right-most users), the larger the angle 176. The larger the angle 176 or the distance d, the smaller the proximity for Equation (2). The proximity should be larger the closer the participants are seated together, e.g., using the cosine of the difference of the angles in which two respective users are directed from the perspective of the listener.

In one or more embodiments, as a user joins the virtual meeting 104, the spacing from left to right (and/or top to bottom) from the left-most to the right-most (and top-most to bottom-most) virtual representations may remain the same as before the user joined or may expand. When the distance from the left-most to the right-most (or top-most to bottom-most) representation remains the same, to accommodate a new virtual representation of the user who joins the virtual meeting 104, the respective virtual representations may be made smaller (e.g., more users presented within a same amount of space). When the distance the left-most to the right-most (or top-most to bottom-most) representation increases to accommodate a new virtual representation of the user who joins the virtual meeting 104, the respective virtual representations may be the same size. When a row or column limit is reached (e.g., a maximum number of user virtual representations in a row or column), a new row or column may be generated, with the virtual seating arrangements accounting for similarity losses based on proximity in multiple directions (e.g., the x-axis and the y-axis), as explained further with respect to FIG. 5.

Figure 2:
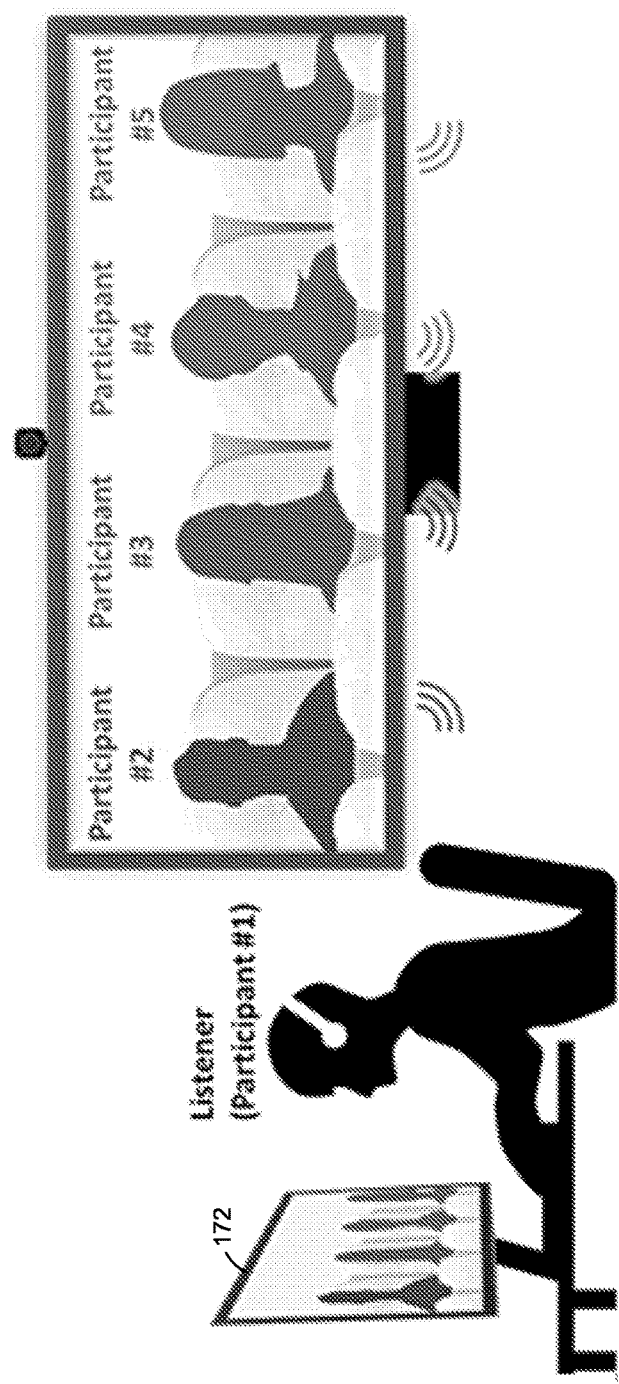
FIG. 2 illustrates an example presentation of a spatial audio-based virtual seating arrangement, in accordance with one or more example embodiments of the present disclosure.

FIG. 2 illustrates an example presentation 200 of a spatial audio-based virtual seating arrangement, in accordance with one or more example embodiments of the present disclosure.

Referring to FIG. 2, Participant 1 may refer to the user 112 of FIG. 1. When the Participant 1, using the device 172 of FIG. 1, joins the virtual meeting 104 of FIG. 1, a virtual seating arrangement may present the other participants of the virtual meeting 104 (e.g., Participants 2-5). In this manner, each participant may be presented the same or a different virtual seating arrangement based on whether all of the participants are represented by the virtual seating arrangement, or based on whether each participant is shown a virtual seating arrangement optimized to show the other participants (e.g., excluding the viewing participant, such as Participant 1 in FIG. 2).

Figure 3:
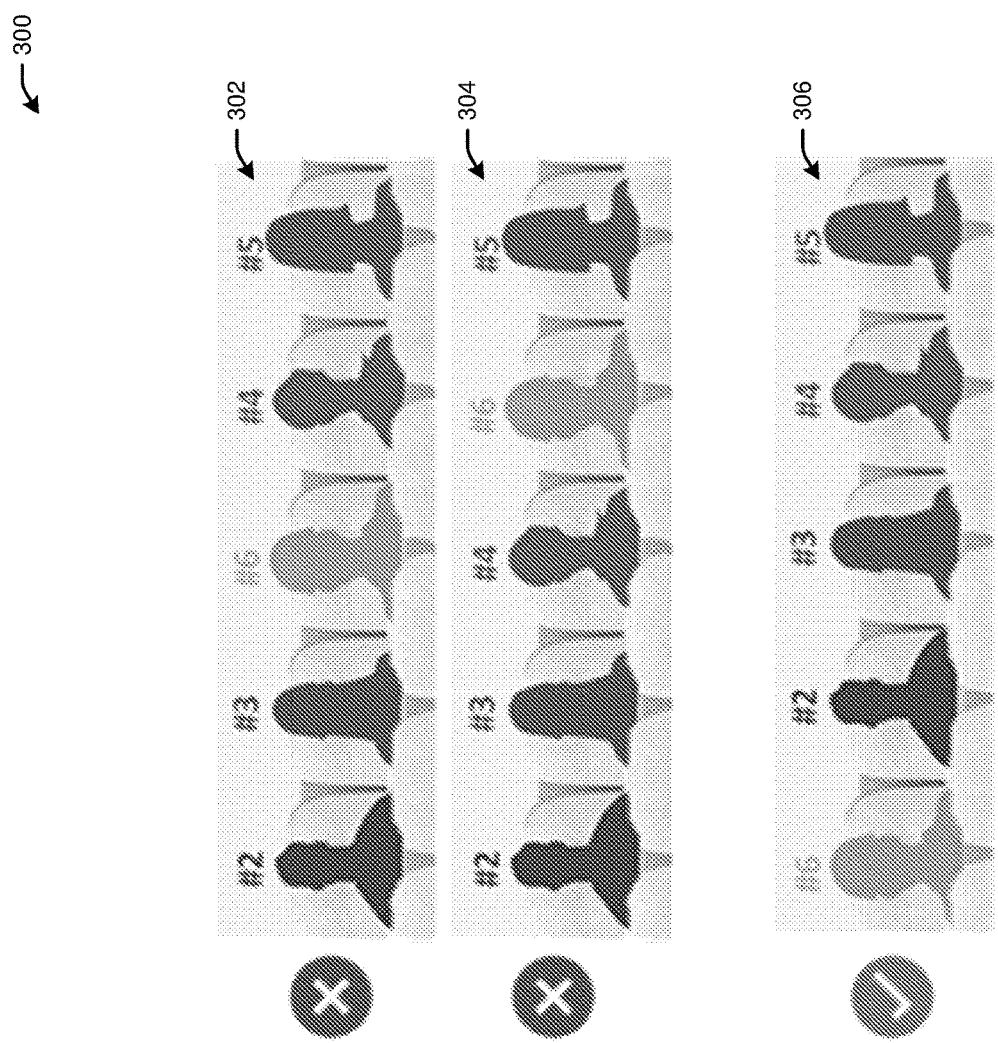
FIG. 3 illustrates an example evaluation of spatial audio-based virtual seating arrangements, in accordance with one or more example embodiments of the present disclosure.

FIG. 3 illustrates an example evaluation 300 of spatial audio-based virtual seating arrangements, in accordance with one or more example embodiments of the present disclosure.

Referring to FIG. 3, the comparison of virtual arrangements (e.g., as shown in FIG. 1) may result in an identification of poor virtual seating arrangements (e.g., virtual seating arrangement 302 and virtual arrangement 304, marked with the "x" as poor), and an identification of strong virtual seating arrangements (e.g., virtual seating arrangement 306, marked with a check mark as strong). In the example shown, Participant 4 and Participant 6 may have similar voices as indicated by a cosine similarity of embedding vectors of their voices. Therefore, a strong (e.g., optimal) virtual seating arrangement may have at least one user in between Participant 4 and Participant 6. The virtual seating arrangement 306 includes sufficient spacing between Participant 4 and Participant 6 to avoid their similar voices presented from similar locations spatially (e.g., with respect to the listener).

Figure 4A:
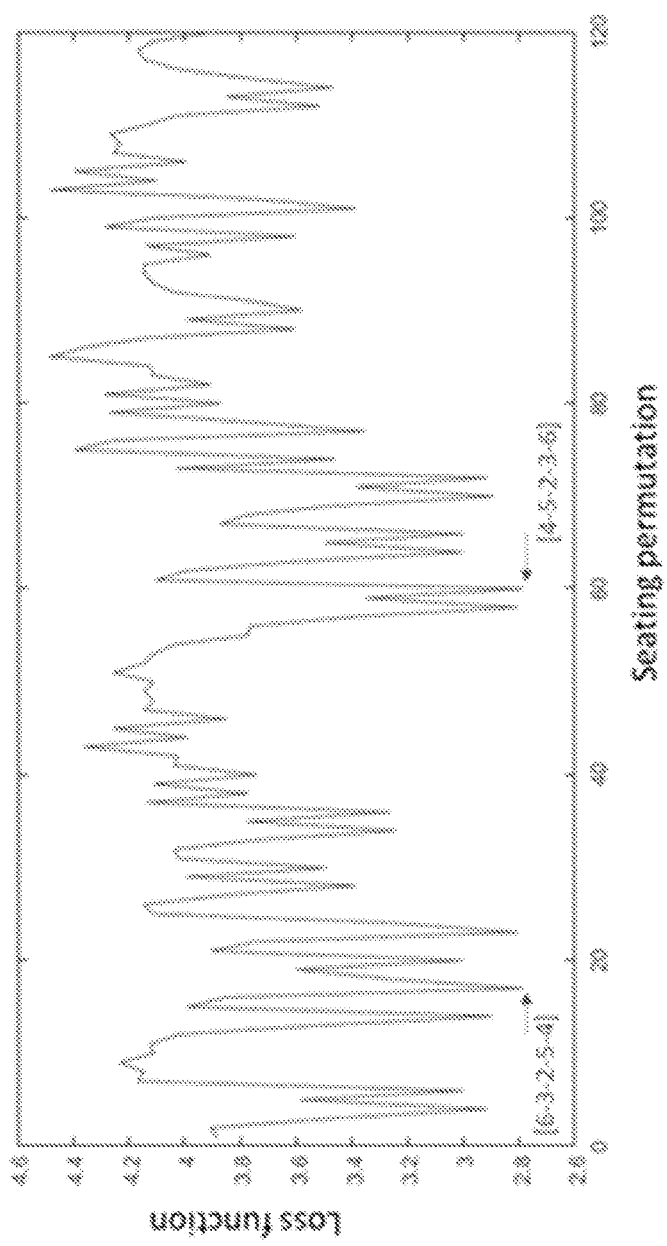
FIG. 4A illustrates a graphical plot of example loss functions used to generate spatial audio-based virtual seating arrangements, in accordance with one or more example embodiments of the present disclosure.

FIG. 4A illustrates a graphical plot 400 of example loss functions used to generate spatial audio-based virtual seating arrangements, in accordance with one or more example embodiments of the present disclosure.

Referring to FIG. 4A, the graphical plot 400 shows only positive loss functions, meaning that the cosine of the angle at which a virtual representation of a virtual seating arrangement (e.g., FIG. 1) varies between 0 and 1 (e.g., the total maximum angle from the left-most to the right-most virtual representations of users is 90 degrees with respect to the viewer). The number of permutations in FIG. 4A is 120, which means that FIG. 4A applies to an example with five remote users in a virtual seating arrangement. The loss function may be determined using Equations (1) and (2) above for the five users.

Still referring to FIG. 4A, there are two minima in the loss function, for the permutations [6-3-2-5-4], and [4-5-2-3-6] (e.g., referring the users/participants 2-6 for whom a virtual seating arrangement is generated for user/participant 1). The two minimum loss function permutations are mirror images of each other, which demonstrates that the method separates participants 6 and 4, with similar voice characteristics, and places them farthest apart to improve comprehension and reduce fatigue.

Figure 4B:
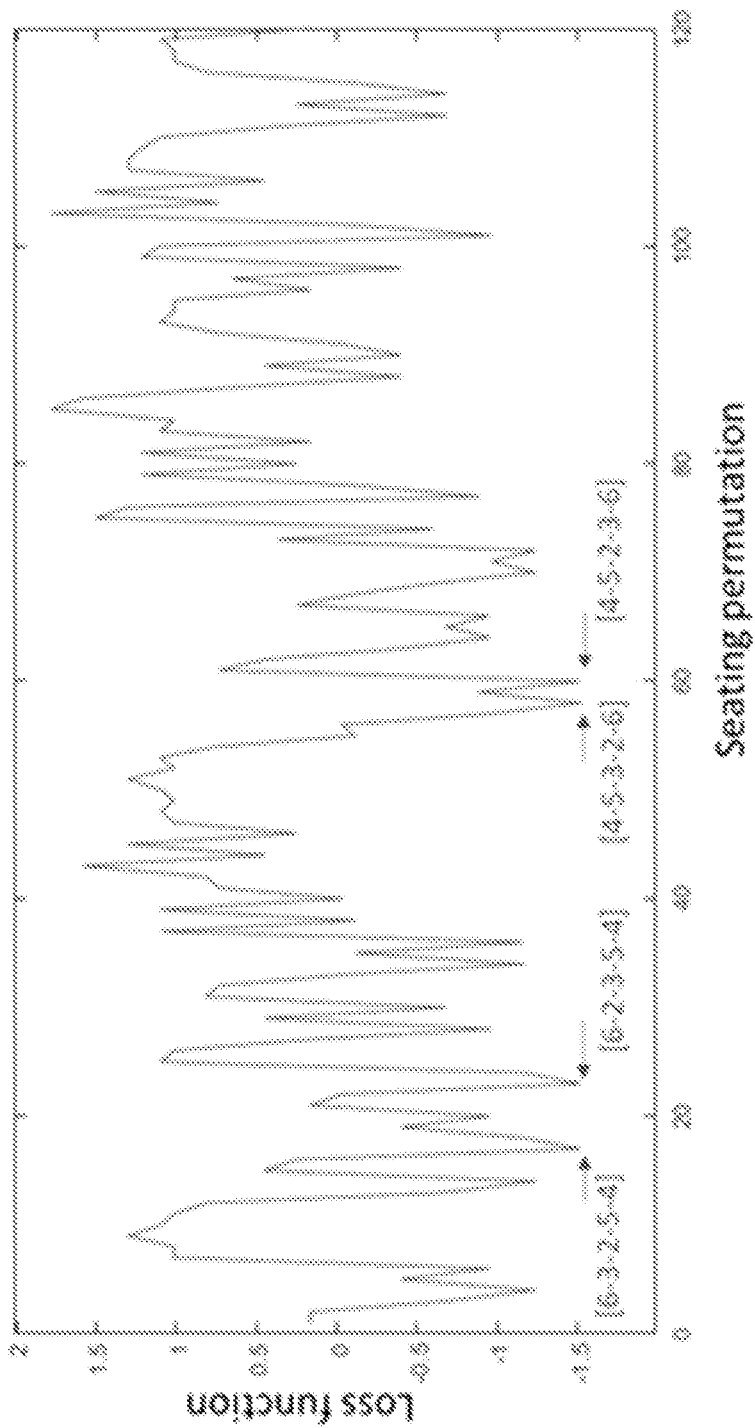
FIG. 4B illustrates a graphical plot of example loss functions used to generate spatial audio-based virtual seating arrangements, in accordance with one or more example embodiments of the present disclosure.

FIG. 4B illustrates a graphical plot 450 of example loss functions used to generate spatial audio-based virtual seating arrangements, in accordance with one or more example embodiments of the present disclosure.

Referring to FIG. 4B, the graphical plot 450 shows both positive and negative loss functions, meaning that the cosine of the angle at which a virtual representation of a virtual seating arrangement (e.g., FIG. 1) varies between −1 and 1 (e.g., the total maximum angle from the left-most to the right-most virtual representations of users is 180 degrees with respect to the viewer). This means that each user/participant is separated by 45 degrees, and one participant is located to the left, and another all the way on the right. The proximity loss function in this case can be negative as the cosine of the angle varies between −1 and 1. The number of permutations in FIG. 4BA is 120, which means that FIG. 4B applies to an example with five remote users in a virtual seating arrangement. The loss function may be determined using Equations (1) and (2) above for the five users.

Still referring to FIG. 4B, there are four minima in the loss function, for the permutations [6-3-2-5-4], [4-5-2-3-6], [6-2-3-5-4] and [4-5-3-2-6] (e.g., referring the users/participants 2-6 for whom a virtual seating arrangement is generated for user/participant 1). These pairs are mirror images of each other, demonstrates that the method separates participants 6 and 4, with similar voice characteristics, and places them farthest apart to improve comprehension and reduce fatigue.

Referring to FIGS. 4A and 4B, the plots are examples, and the techniques described herein apply to different numbers of users/participants with varying angles/spacing for the total number of users/participants in a virtual seating arrangement (e.g., by applying Equations (1) and (2) above).

Referring to FIGS. 1-4B, the above examples do not include any boundary conditions for the permutations. Boundary conditions may be used, for example, to represent the initial order when a new participant enters the meeting. Rather than reshuffling all existing participants based on all possible permutations, the algorithm may evaluate the permutations where the new participant may be inserted into the existing order.

Figure 5:
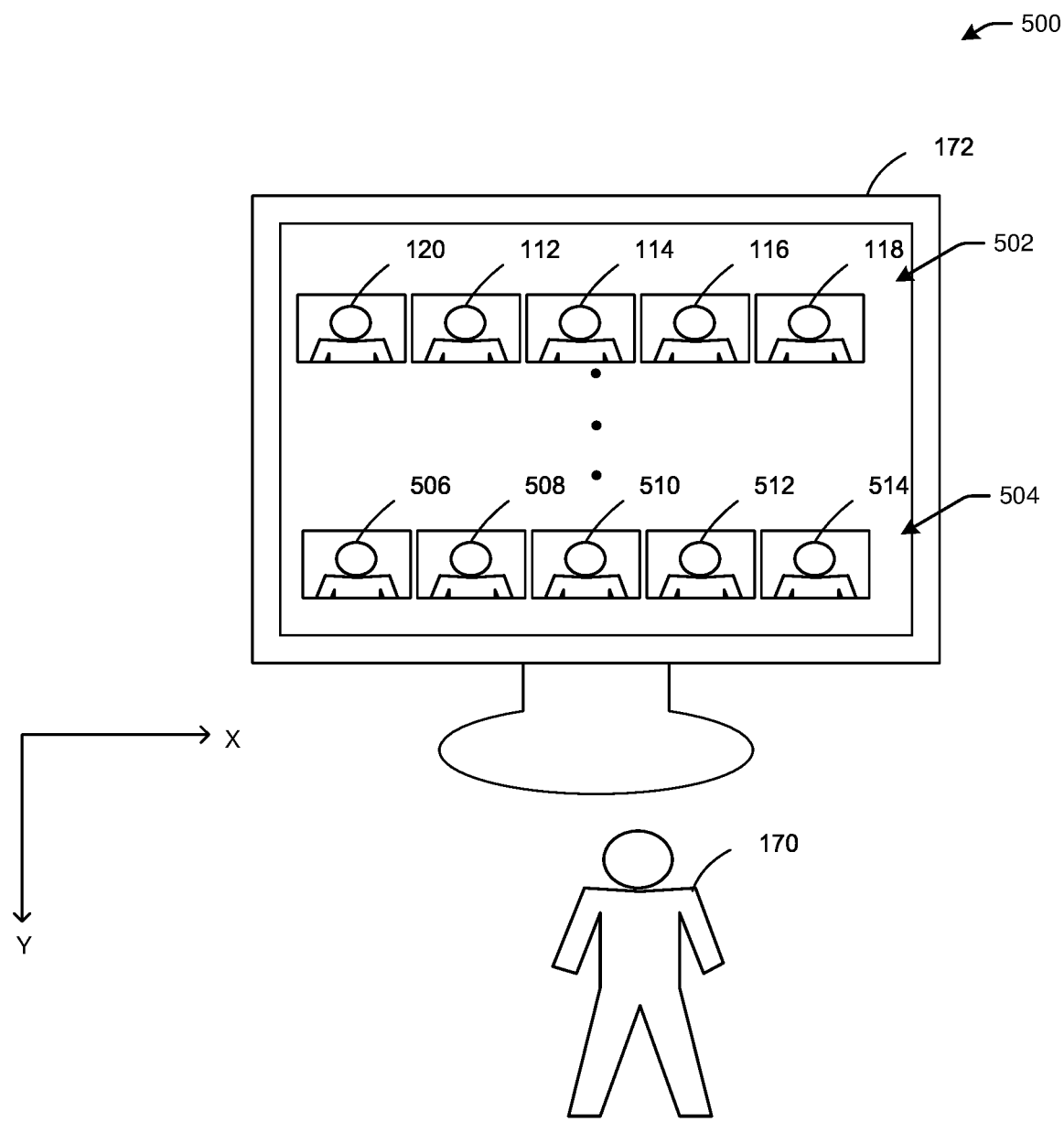
FIG. 5 illustrates an example presentation of a spatial audio-based virtual seating arrangement, in accordance with one or more example embodiments of the present disclosure.

FIG. 5 illustrates an example presentation 500 of a spatial audio-based virtual seating arrangement, in accordance with one or more example embodiments of the present disclosure.

Referring to FIG. 5, the presentation 500 may include a multi-elevation (e.g., multi-row) virtual seating arrangement to accommodate many participants. For example, multiple rows along the x-axis as shown, such as row 502 and row 504, may show virtual representations of meeting participants (e.g., the row 502 may include the user 102, the user 112, the user 114, the user 116, and the user 118, and the row 504 may include user 506, user 508, user 510, user 512, and user 514). To determine the optimal virtual seating arrangement when multiple rows may be needed to fit the virtual representations of participants onto the display of the device 172, the similarity scores for the participants may be determined using Equation (1) above, and the loss function using Equation (2) above may account for voice similarities in multiple directions (e.g., along the x-axis and the y-axis). In particular, the proximity between participants may account for the distance in the x or y direction of any two respective participants A and B. In this manner, as the number of virtual meeting participants grows large enough that the number of users may not be represented in a single row, additional rows may be generated using the same enhanced techniques to optimize audio when spatial audio is used.

Figure 6:
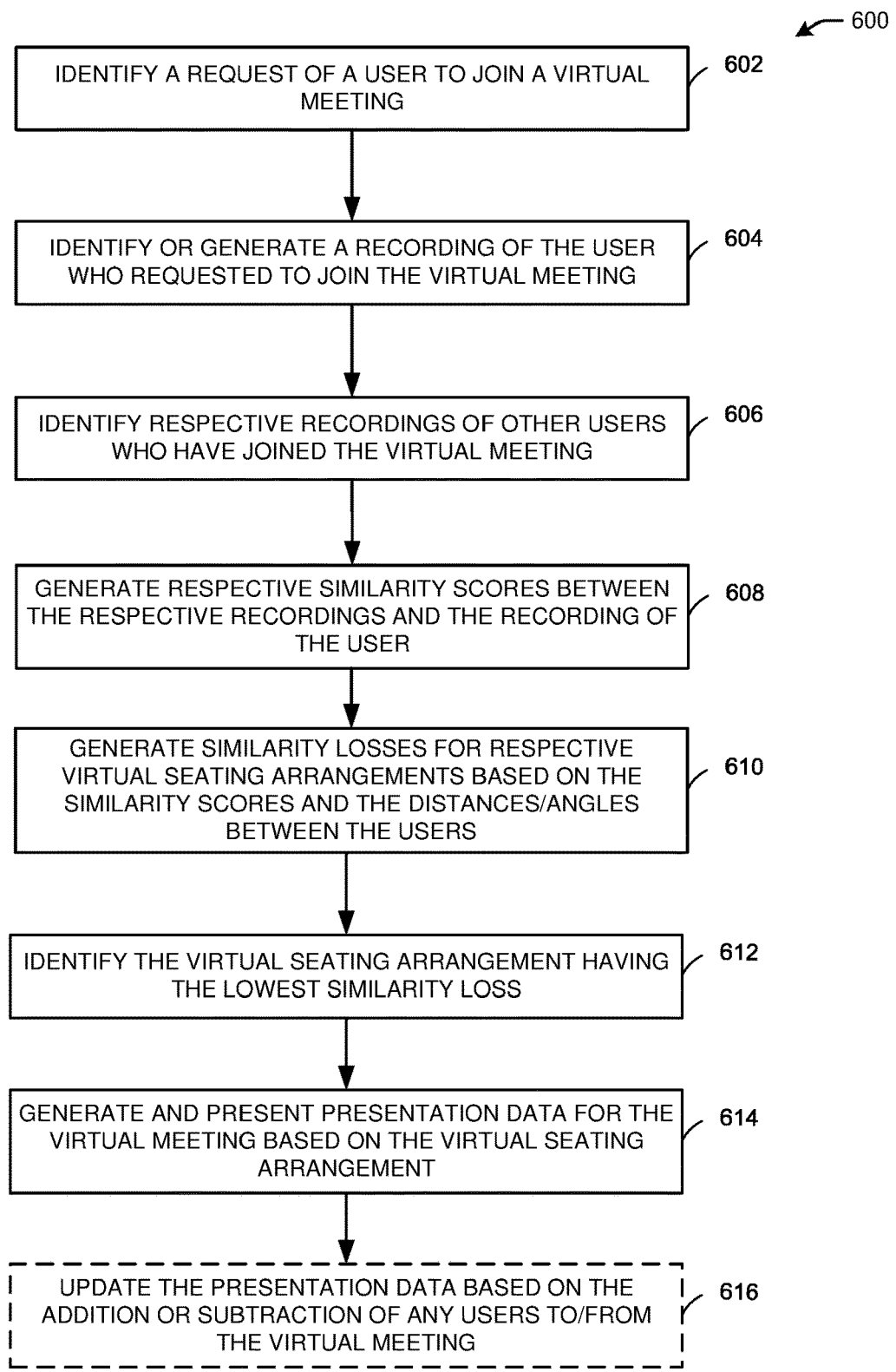
FIG. 6 illustrates a flow diagram of illustrative process for generating spatial audio-based virtual seating arrangements, in accordance with one or more example embodiments of the present disclosure.

FIG. 6 illustrates a flow diagram of illustrative process 600 for generating spatial audio-based virtual seating arrangements, in accordance with one or more example embodiments of the present disclosure.

Figure 7:
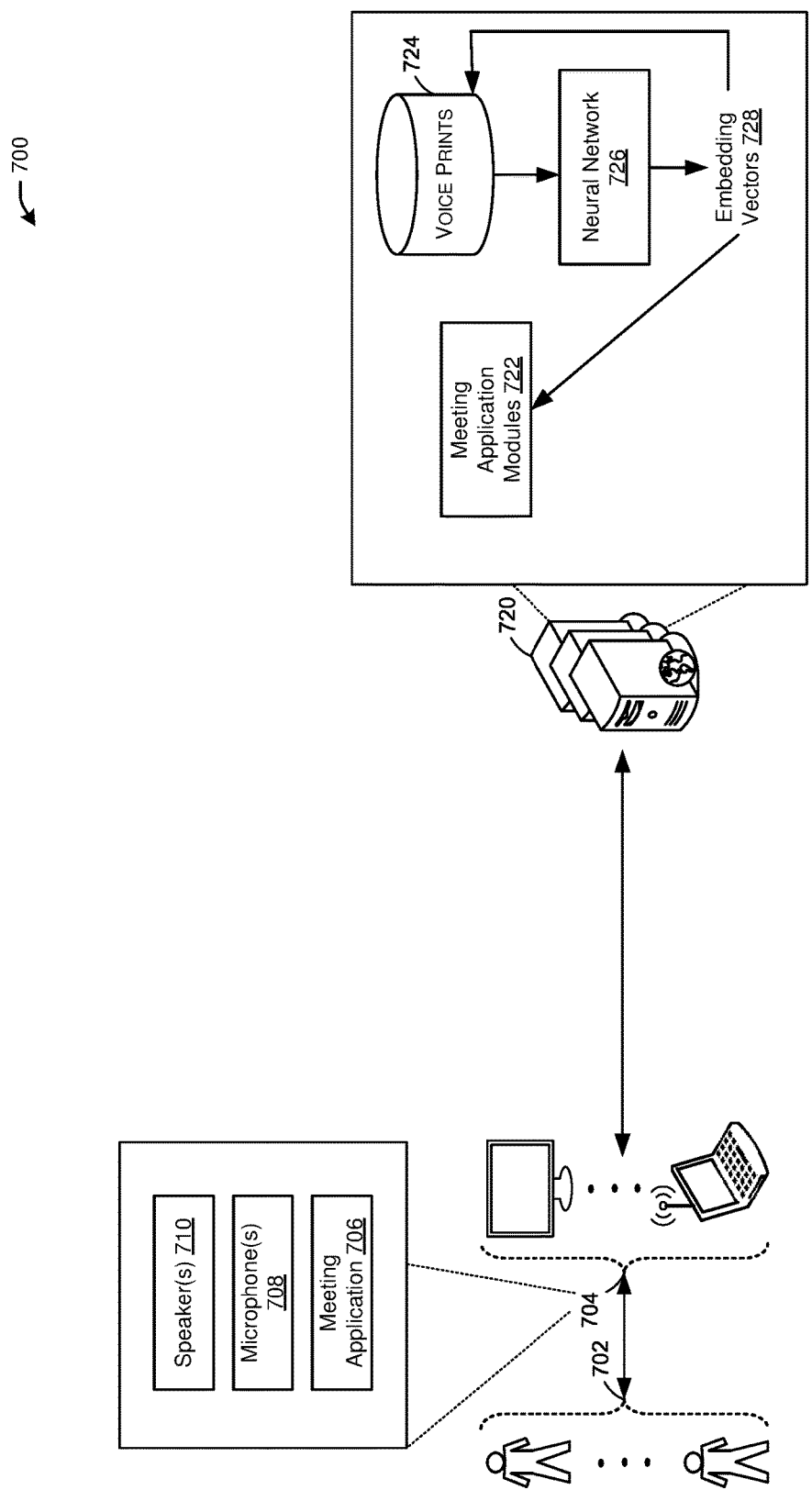
FIG. 7 illustrates an example system for generating spatial audio-based virtual seating arrangements, in accordance with one or more example embodiments of the present disclosure.

At block 602, a device (e.g., a remote system 720 as shown in FIG. 7) may identify a user's request to join a virtual meeting (e.g., a request of the user 102 to join the virtual meeting 104 of FIG. 1). The request may be received on the front-end (e.g., client side) of the virtual meeting application (e.g., a virtual meeting application 706 as shown in FIG. 7) based on a user click, touch, gesture, voice input, or the like, requesting access to the virtual meeting.

At block 604, the device may identify or generate a recording of the user who requested to join the meeting. As shown in FIG. 7, the device may have access to voice prints (e.g., voice recordings of users). When a user first joins a virtual meeting and has not provided a voice recording, the device may generate a voice recording of the user by prompting the user to speak (e.g., with user consent and in accordance with relevant laws). The voice recordings may be stored and accessible to the device so that when a user joins a virtual meeting, the device may retrieve the voice recording for the user.

At block 606, the device may identify the recordings of other users who have joined the virtual meeting. Similarly to block 604, when any user joins a virtual meeting and has not yet provided a voice recording, the user may be prompted to provide a voice recording. The device may retrieve the voice recordings of any users who join a virtual meeting so that the device may compare the voices of the users to generate an optimal virtual seating arrangement to use with spatial audio for the virtual meeting.

At block 608, the device may generate similarity scores between the users of a virtual meeting. For example, when user A joins a meeting with user B and user C, the device may determine the cosine similarity (e.g., using Equation (1) above) between user A and user B, between user A and user C, and between user B and user C. The device may use the voice recordings of the users to generate vector embeddings of any user's speech. The vector embeddings may be extracted (e.g., using a neural network as explained further with respect to FIG. 7), resulting in multi-dimensional features representative of the speech. The features represented by the vector embeddings of one voice print may be compared to the features represented by the vector embeddings of another voice print by using the cosine similarity of Equation (1). In particular, vectors A and B of Equation (1) may represent the vector embeddings extracted from user A's voice recording and from user B's voice recording, respectively. Other similarity measures may be used other than cosine similarity to compare the similarity between the vector embeddings of one voice print to the vector embeddings of another voice print.

At block 610, the device may generate similarity losses for the different possible virtual seating arrangements based on the similarity scores of block 608. The similarity losses may be based on Equation (2) above. Using the example of users A, B, and C, the possible virtual seating arrangements are A-B-C, A-C-B, B-A-C, B-C-A, C-A-B, and C-B-A. Therefore, the device may generate the similarity losses for each of the possible seating arrangements based on the different proximities of the different arrangements and based on the similarities of the vector embeddings of the users' voice prints. The amount of separation between the users may depend on the maximum total angle used for the spatial audio, which may be preset, based on user selection, or dependent on audio output capabilities. In particular, the proximity should be larger the closer the users are seated together, e.g., using the cosine of the difference of the angles in which users A and B are directed from the perspective of the listener.

At block 612, the device may identify the virtual seating arrangement having the lowest similarity loss (e.g., as shown in FIGS. 4A and 4B). There may be multiple virtual seating arrangements that are mirror images of one another, so any virtual seating arrangement of the options having the lowest similarity loss may be selected. To select from among the multiple options having the lowest similarity loss may be selected, the selection may be random or based on a user preference, such as a user selection (e.g., when presented an option to select an arrangement) or a user preference (e.g., to present a particular user in a particular location on a screen).

At block 614, the device may generate and present presentation data for the virtual meeting based on the virtual seating arrangement. For example, continuing the example with users A, B, and C, one of the six arrangements described above with respect to block 610 may be selected based on having the lowest similarity loss. When the arrangement is A-B-C, for example, the presentation data may include a virtual representation of user A in the left-most location on screen, a virtual representation of user C in the right-most location on screen, and a virtual representation of user B in between user A and user C. The amount of separation between the users may depend on the maximum total angle used for the spatial audio, which may be preset, based on user selection, or dependent on audio output capabilities. When the number of users in the virtual meeting exceeds a maximum number of users allowed in a row or column, the presentation data may include multiple rows and/or columns.

At block 616, optionally, the device may update the presentation data based on the addition or subtraction of any users to/from the virtual meeting. When a user is added to existing users in a virtual meeting, the maximum total angle used for the spatial audio may change (e.g., increase) to allow for more virtual representations of users to fit within a row or column (e.g., allowing for each virtual representation to stay the same size), or may remain the same, possibly requiring the size of the virtual representations of users to be smaller to fit within the same space (and/or decreasing the spacing between the users to accommodate additional users). The device may present the presentation data or facilitate the presentation by providing the presentation data as user interface data to be presented by a device on which the front-end of the virtual meeting application is running.

FIG. 7 illustrates an example system 700 for generating spatial audio-based virtual seating arrangements, in accordance with one or more example embodiments of the present disclosure.

Referring to FIG. 7, users 702 (e.g., including the user 102 of FIG. 1) may use devices 704 (e.g., including the device 106 and the device 172 of FIG. 1) to access a virtual meeting application 706 (e.g., to join the virtual meeting 104 of FIG. 1). The devices 704 may include or be in communication with one or more microphones 708 to capture audio from the users 702. The devices may include or be in communication with one or more speakers 710 capable of presenting spatial audio, such as binaural audio, so that when multiple users are in the virtual meeting, the sound presented when a respective user speaks appears to originate from the location of the user's virtual representation on the devices 704 (e.g., referring to FIG. 1, when the user 102 is the left-most user on screen, the audio when the user 102 speaks may be presented as coming from the left-most portion of the screen, along the x-axis). The one or more microphones 708 may capture audio of the users 702, such as speech during a virtual meeting, and voice recordings used to generate voice prints. The audio captured by the one or more microphones 708 may be sent to a remote system 720 for processing.

Still referring to FIG. 7, the remote system 720 may include back-end meeting application modules 722, representing the back-end of the meeting application 706 running on the front-end of the devices 704. The remote system 720 may store voice prints 724 (e.g., in a data storage) generated based on the voice recordings provided by the devices 704. A neural network 726 may generate embedding vectors 728 used as the voice prints of respective users, as explained further herein. The meeting application modules may use the embedding vectors 728 as the voice prints 724 to calculate the voice similarities (e.g., using Equation (1) above), to determine the similarity losses (e.g., using Equation (2) above), and to identify the virtual seating arrangements with the lowest similarity losses for implementation in a virtual meeting. The virtual meeting application modules 722 may generate and provide the presentation data representing the virtual seating arrangements to the virtual meeting application 706 on the front-end to be presented using the devices 704.

In one or more embodiments, the neural network 726 may be a deep neural network (DNN) that may extract the embedding vectors 728 from voice recordings of the users 702. The neural network 726 may use multiple layers in which a layer may correspond to an audio frame, allowing for a temporal analysis of a user's voice. Each layer may consider context of a preceding audio frame in a sequence of audio frames of a user's voice recording. Another layer may aggregate audio frame-level outputs and perform calculations such as mean and standard deviation of the outputs, resulting in the embedding vectors 728, which may include hundreds of vector dimensions representing various features of a user's voice audio. The neural network 726 may be trained to classify N speakers in training data (e.g., different formats of speech clips from multiple speakers) that include speech features. After training, the neural network 726 may extract the embedding vectors 728. Other techniques of extracting speech embeddings may be implemented, so the above description of the neural network 726 is exemplary and not meant to be limiting.

The examples herein are not meant to be limiting.

Figure 8:
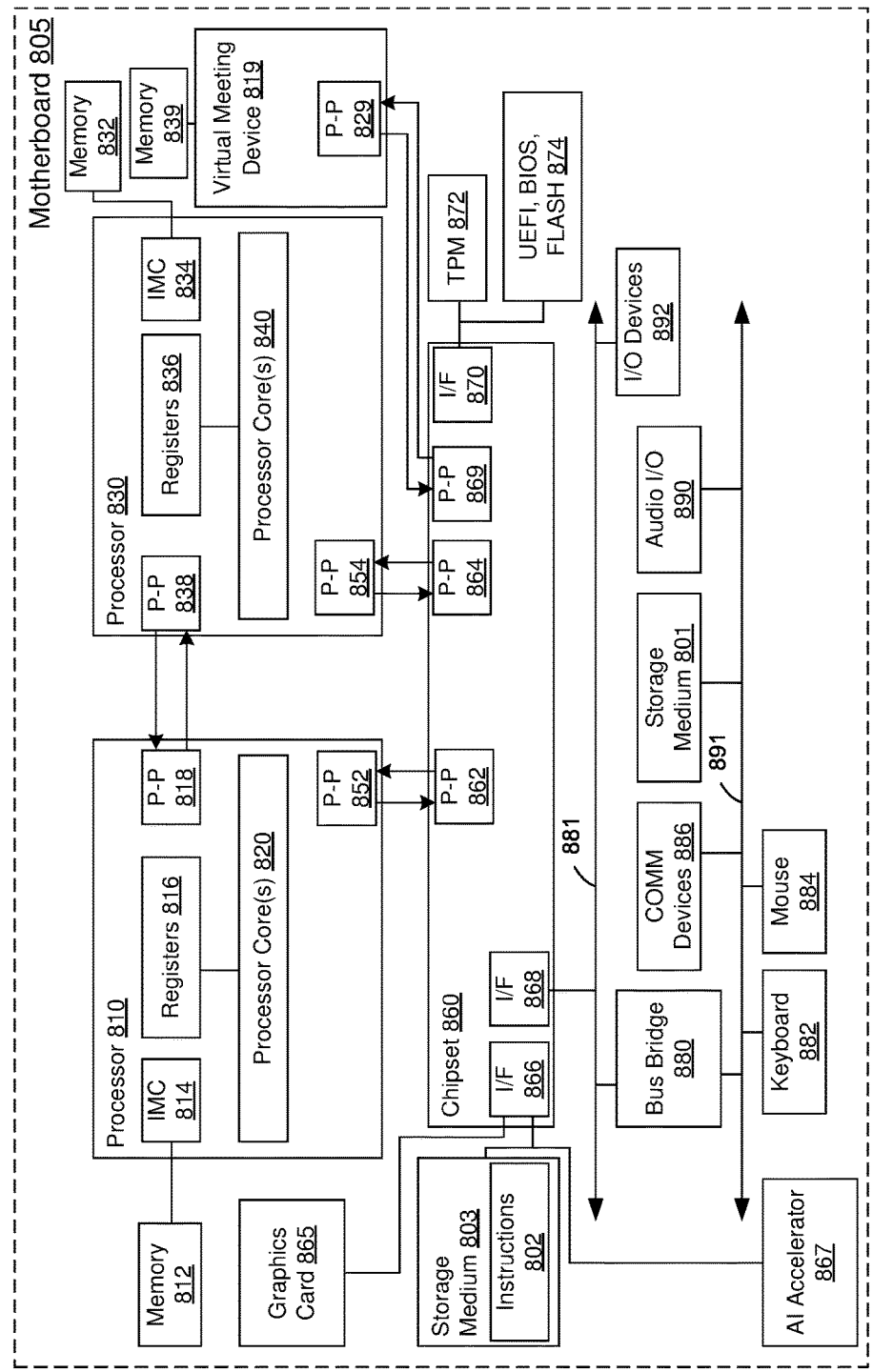
FIG. 8 is a block diagram illustrating components, in accordance with one or more example embodiments of the present disclosure.

FIG. 8 illustrates an embodiment of an exemplary system 800, in accordance with one or more example embodiments of the present disclosure.

In various embodiments, the computing system 800 may comprise or be implemented as part of an electronic device.

In some embodiments, the computing system 800 may be representative, for example, of a computer system that implements one or more components of FIG. 1 and FIG. 7.

The embodiments are not limited in this context. More generally, the computing system 800 is configured to implement all logic, systems, processes, logic flows, methods, equations, apparatuses, and functionality described herein and with reference to FIGS. 1-7.

The system 800 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores.

In at least one embodiment, the computing system 800 is representative of one or more components of FIG. 1 and FIG. 7. More generally, the computing system 800 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard 805 for mounting platform components. The motherboard 805 is a point-to-point interconnect platform that includes a processor 810, a processor 830 coupled via a point-to-point interconnects as an Ultra Path Interconnect (UPI), and a virtual meeting device 819 (e.g., representing any of the components and functionality of the devices of FIGS. 1 and 7, and capable of performing the process 600 of FIG. 6). In other embodiments, the system 800 may be of another bus architecture, such as a multi-drop bus. Furthermore, each of processors 810 and 830 may be processor packages with multiple processor cores. As an example, processors 810 and 830 are shown to include processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

The processors 810 and 830 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 810, and 830.

The processor 810 includes an integrated memory controller (IMC) 814 and point-to-point (P-P) interfaces 818 and 852. Similarly, the processor 830 includes an IMC 834 and P-P interfaces 838 and 854. The IMC's 814 and 834 couple the processors 810 and 830, respectively, to respective memories, a memory 812 and a memory 832. The memories 812 and 832 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 812 and 832 locally attach to the respective processors 810 and 830.

In addition to the processors 810 and 830, the system 800 may include the virtual meeting device 819. The virtual meeting device 819 may be connected to chipset 860 by means of P-P interfaces 829 and 869. The virtual meeting device 819 may also be connected to a memory 839. In some embodiments, the virtual meeting device 819 may be connected to at least one of the processors 810 and 830. In other embodiments, the memories 812, 832, and 839 may couple with the processor 810 and 830, and the virtual meeting device 819 via a bus and shared memory hub.

System 800 includes chipset 860 coupled to processors 810 and 830. Furthermore, chipset 860 can be coupled to storage medium 803, for example, via an interface (I/F) 866. The I/F 866 may be, for example, a Peripheral Component Interconnect-enhanced (PCI-e). The processors 810, 830, and the virtual meeting device 819 may access the storage medium 803 through chipset 860.

Storage medium 803 may comprise any non-transitory computer-readable storage medium or machine-readable storage medium, such as an optical, magnetic or semiconductor storage medium. In various embodiments, storage medium 803 may comprise an article of manufacture. In some embodiments, storage medium 803 may store computer-executable instructions, such as computer-executable instructions 802 to implement one or more of processes or operations described herein, (e.g., process 600 of FIG. 6). The storage medium 803 may store computer-executable instructions for any equations depicted above. The storage medium 803 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 810 couples to a chipset 860 via P-P interfaces 852 and 862 and the processor 830 couples to a chipset 860 via P-P interfaces 854 and 864. Direct Media Interfaces (DMIs) may couple the P-P interfaces 852 and 862 and the P-P interfaces 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the UEFI, BIOS, Flash component 874 via an interface (IF) 870. The TPM 872 is a dedicated microcontroller designed to secure hardware by integrating cryptographic keys into devices. The UEFI, BIOS, Flash component 874 may provide pre-boot code.

Furthermore, chipset 860 includes the I/F 866 to couple chipset 860 with a high-performance graphics engine, graphics card 865. In other embodiments, the system 800 may include a flexible display interface (FDI) between the processors 810 and 830 and the chipset 860. The FDI interconnects a graphics processor core in a processor with the chipset 860.

Various I/O devices 892 couple to the bus 881, along with a bus bridge 880 which couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, a storage medium 801, and an audio I/O 890.

The artificial intelligence (AI) accelerator 867 may be circuitry arranged to perform computations related to AI. The AI accelerator 867 may be connected to storage medium 803 and chipset 860. The AI accelerator 867 may deliver the processing power and energy efficiency needed to enable abundant-data computing. The AI accelerator 867 is a class of specialized hardware accelerators or computer systems designed to accelerate artificial intelligence and machine learning applications, including artificial neural networks and machine vision. The AI accelerator 867 may be applicable to algorithms for robotics, internet of things, other data-intensive and/or sensor-driven tasks.

Many of the I/O devices 892, communication devices 886, and the storage medium 801 may reside on the motherboard 805 while the keyboard 882 and the mouse 884 may be add-on peripherals. In other embodiments, some or all the I/O devices 892, communication devices 886, and the storage medium 801 are add-on peripherals and do not reside on the motherboard 805.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Various example embodiments are described herein.

A method for presenting video conferencing virtual seating arrangements with spatial audio, the method comprising: identifying, by at least one processor of a device, a request received from a first user to join a virtual meeting provided by a computer application, the virtual meeting using spatial audio; identifying, by the at least one processor, based on the request, a first recording of a first voice of the first user; identifying, by the at least one processor, respective recordings of voices of respective additional users who have joined the virtual meeting; generating, by the at least one processor, based on a first comparison of the first recording to a second recording of the respective recordings, a first similarity score indicative of a first similarity between the first voice of the first user and a second voice of a second user of the additional users; generating, by the at least one processor, based on a second comparison of the first recording to a third recording of the respective recordings, a second similarity score indicative of a second similarity between the first voice of the first user and a third voice of a third user of the additional users, the first similarity score less than the second similarity score; determining, by the at least one processor, based on the first similarity score and the second similarity score, a similarity loss for a virtual seating arrangement for which the first user and the second user are positioned with a distance between one another; determining, by the at least one processor, that the similarity loss is a minimum similarity loss of respective similarity losses for different virtual seating arrangements comprising the first user and the second user; generating, by the at least one processor, based on the determination that the similarity loss is the minimum similarity loss, presentation data for use with the spatial audio, the presentation data comprising a virtual representation of the first user and respective virtual representations of the additional users arranged based on the virtual seating arrangement; and causing presentation, by the at least one processor, of the presentation data.

Example 2 may include the method of example 1 and/or some other example herein, further comprising: determining, based on a total number of users who have joined the virtual meeting, a second distance between a right-most virtual representation of a fifth user and a left-most virtual representation of a sixth user of the virtual seating arrangement; and determining, based on the second distance and the total number of users, an angle between each respective user of the total number of users of the virtual seating arrangement, wherein determining the similarity loss is further based on the angle.

Example 3 may include the method of example 1 and/or some other example herein, wherein the first similarity score is a first cosine similarity score, and wherein the second similarity score is a second cosine similarity score.

Example 4 may include the device of example 3 and/or some other example herein, further comprising: generating a first vector embedding indicative of features of the first voice of the first user; generating a second vector embedding indicative of features of the second voice of the second user; and generating a third vector embedding indicative of features of the second voice of the third user, wherein the first cosine similarity score is based on the first vector embedding and the second vector embedding, and the second cosine similarity score is based on the first vector embedding and the third vector embedding.

Example 5 may include the method of example 1 and/or some other example herein, further comprising: identifying a second request received from a fourth user to join the virtual meeting; identifying, based on the second request, a fourth recording of a fourth voice of the fourth user; generating, based on a third comparison of the first recording to the fourth recording, a third similarity score indicative of a third similarity between the first voice and the fourth voice; determining, based on the first similarity score, the second similarity score, and the third similarity score, a second similarity loss for a second virtual seating arrangement for which the first user and the fourth user are positioned with a second distance between one another; determining that the second similarity loss is a minimum similarity loss of respective similarity losses for different virtual seating arrangements comprising the first user, the second user, the third user, and the fourth user; generating second presentation data for use with the spatial audio, the second presentation data comprising the virtual representation of the first user, a second virtual representation of the fourth user, and respective virtual representations of the additional users arranged based on the second virtual seating arrangement; and causing presentation of the second presentation data.

Example 6 may include the method of example 5 and/or some other example herein, wherein the virtual seating arrangement uses a third distance between a right-most virtual representation of a fifth user and a left-most virtual representation of a sixth user of the virtual seating arrangement, wherein the second virtual seating arrangement uses the third distance between the right-most virtual representation and the left-most virtual representation, and wherein the virtual representations of the users in the virtual seating arrangement are larger than the virtual representations of the users in the second virtual seating arrangement.

Example 7 may include the method of example 1 and/or some other example herein, wherein the virtual seating arrangement uses a third distance between a right-most virtual representation of a fifth user and a left-most virtual representation of a sixth user of the virtual seating arrangement, wherein the second virtual seating arrangement uses a fourth distance between the right-most virtual representation and the left-most virtual representation, the fourth distance greater than the third distance, and wherein the virtual representations of the users in the virtual seating arrangement are a same size as the virtual representations of the users in the second virtual seating arrangement.

Example 8 may include the method of example 1 and/or some other example herein, further comprising: determining that the recording of the first voice is absent from a data storage of recordings; generating the recording of the first voice based on the determination that the first voice is absent from the data storage; and storing the recording of the first voice in the data storage.

Example 9 may include a non-transitory computer-readable storage medium comprising instructions to cause processing circuitry of a device, upon execution of the instructions by the processing circuitry, to: identify a request received from a first user to join a virtual meeting provided by a computer application, the virtual meeting using spatial audio; identify, based on the request, a first recording of a first voice of the first user; identify respective recordings of voices of respective additional users who have joined the virtual meeting; generate, based on a first comparison of the first recording to a second recording of the respective recordings, a first similarity score indicative of a first similarity between the first voice of the first user and a second voice of a second user of the additional users; generate, based on a second comparison of the first recording to a third recording of the respective recordings, a second similarity score indicative of a second similarity between the first voice of the first user and a third voice of a third user of the additional users, the first similarity score less than the second similarity score; determine, based on the first similarity score and the second similarity score, a similarity loss for a virtual seating arrangement for which the first user and the second user are positioned with a distance between one another; determine that the similarity loss is a minimum similarity loss of respective similarity losses for different virtual seating arrangements comprising the first user and the second user; generate, based on the determination that the similarity loss is the minimum similarity loss, presentation data for use with the spatial audio, the presentation data comprising a virtual representation of the first user and respective virtual representations of the additional users arranged based on the virtual seating arrangement; and cause presentation of the presentation data.

Example 10 may include the non-transitory computer-readable medium of example 9 and/or some other example herein, wherein the instructions further cause the processing circuitry to: determine, based on a total number of users who have joined the virtual meeting, a second distance between a right-most virtual representation of a fifth user and a left-most virtual representation of a sixth user of the virtual seating arrangement; and determine, based on the second distance and the total number of users, an angle between each respective user of the total number of users of the virtual seating arrangement, wherein to determine the similarity loss is further based on the angle.

Example 11 may include the non-transitory computer-readable medium of example 9 and/or some other example herein, wherein the first similarity score is a first cosine similarity score, and wherein the second similarity score is a second cosine similarity score.

Example 12 may include the non-transitory computer-readable medium of example 11 and/or some other example herein, wherein the instructions further cause the processing circuitry to: generate a first vector embedding indicative of features of the first voice of the first user; generate a second vector embedding indicative of features of the second voice of the second user; and generate a third vector embedding indicative of features of the second voice of the third user, wherein the first cosine similarity score is based on the first vector embedding and the second vector embedding, and the second cosine similarity score is based on the first vector embedding and the third vector embedding.

Example 13 may include the non-transitory computer-readable medium of example 9 and/or some other example herein, wherein the instructions further cause the processing circuitry to: identify a second request received from a fourth user to join the virtual meeting; identify, based on the second request, a fourth recording of a fourth voice of the fourth user; generate, based on a third comparison of the first recording to the fourth recording, a third similarity score indicative of a third similarity between the first voice and the fourth voice; determine, based on the first similarity score, the second similarity score, and the third similarity score, a second similarity loss for a second virtual seating arrangement for which the first user and the fourth user are positioned with a second distance between one another; determine that the second similarity loss is a minimum similarity loss of respective similarity losses for different virtual seating arrangements comprising the first user, the second user, the third user, and the fourth user; generate, for the virtual meeting, second presentation data for use with the spatial audio, the second presentation data comprising the virtual representation of the first user, a second virtual representation of the fourth user, and respective virtual representations of the additional users arranged based on the second virtual seating arrangement; and cause presentation of the second presentation data.

Example 14 may include the non-transitory computer-readable medium of example 13 and/or some other example herein, wherein the virtual seating arrangement uses a third distance between a right-most virtual representation of a fifth user and a left-most virtual representation of a sixth user of the virtual seating arrangement, wherein the second virtual seating arrangement uses the third distance between the right-most virtual representation and the left-most virtual representation, and wherein the virtual representations of the users in the virtual seating arrangement are larger than the virtual representations of the users in the second virtual seating arrangement.

Example 15 may include the non-transitory computer-readable medium of example 13 and/or some other example herein, wherein the virtual seating arrangement uses a third distance between a right-most virtual representation of a fifth user and a left-most virtual representation of a sixth user of the virtual seating arrangement, wherein the second virtual seating arrangement uses a fourth distance between the right-most virtual representation and the left-most virtual representation, the fourth distance greater than the third distance, and wherein the virtual representations of the users in the virtual seating arrangement are a same size as the virtual representations of the users in the second virtual seating arrangement.

Example 16 may include a device for presenting video conferencing virtual seating arrangements using spatial audio, the device comprising processing circuitry coupled to memory, the processing circuitry being configured to: identify a request received from a first user to join a virtual meeting provided by a computer application, the virtual meeting using spatial audio; identify, based on the request, a first recording of a first voice of the first user; identify respective recordings of voices of respective additional users who have joined the virtual meeting; generate, based on a first comparison of the first recording to a second recording of the respective recordings, a first similarity score indicative of a first similarity between the first voice of the first user and a second voice of a second user of the additional users; generate, based on a second comparison of the first recording to a third recording of the respective recordings, a second similarity score indicative of a second similarity between the first voice of the first user and a third voice of a third user of the additional users, the first similarity score less than the second similarity score; determine, based on the first similarity score and the second similarity score, a similarity loss for a virtual seating arrangement for which the first user and the second user are positioned with a distance between one another; determine that the similarity loss is a minimum similarity loss of respective similarity losses for different virtual seating arrangements comprising the first user and the second user; generate, based on the determination that the similarity loss is the minimum similarity loss, presentation data for use with the spatial audio, the presentation data comprising a virtual representation of the first user and respective virtual representations of the additional users arranged based on the virtual seating arrangement; and cause presentation of the presentation data.

Example 17 may include the device of example 16 and/or some other example herein, wherein the processing circuitry is further configured to: determine, based on a total number of users who have joined the virtual meeting, a second distance between a right-most virtual representation of a fifth user and a left-most virtual representation of a sixth user of the virtual seating arrangement; and determine, based on the second distance and the total number of users, an angle between each respective user of the total number of users of the virtual seating arrangement, wherein to determine the similarity loss is further based on the angle.

Example 18 may include the device of example 16 and/or some other example herein, wherein the first similarity score is a first cosine similarity score, and wherein the second similarity score is a second cosine similarity score.

Example 19 may include the device of example 18 and/or some other example herein, wherein the processing circuitry is further configured to: generate a first vector embedding indicative of features of the first voice of the first user; generate a second vector embedding indicative of features of the second voice of the second user; and generate a third vector embedding indicative of features of the second voice of the third user, wherein the first cosine similarity score is based on the first vector embedding and the second vector embedding, and the second cosine similarity score is based on the first vector embedding and the third vector embedding.

Example 20 may include the device of example 16 and/or some other example herein, wherein the processing circuitry is further configured to: identify a second request received from a fourth user to join the virtual meeting; identify, based on the second request, a fourth recording of a fourth voice of the fourth user; generate, based on a third comparison of the first recording to the fourth recording, a third similarity score indicative of a third similarity between the first voice and the fourth voice; determine, based on the first similarity score, the second similarity score, and the third similarity score, a second similarity loss for a second virtual seating arrangement for which the first user and the fourth user are positioned with a second distance between one another; determine that the second similarity loss is a minimum similarity loss of respective similarity losses for different virtual seating arrangements comprising the first user, the second user, the third user, and the fourth user; generate, for the virtual meeting, second presentation data for use with the spatial audio, the second presentation data comprising the virtual representation of the first user, a second virtual representation of the fourth user, and respective virtual representations of the additional users arranged based on the second virtual seating arrangement; and cause presentation of the second presentation data.

Example 21 may include an apparatus comprising means for: identifying, by at least one processor of a device, a request received from a first user to join a virtual meeting provided by a computer application, the virtual meeting using spatial audio; identifying, by the at least one processor, based on the request, a first recording of a first voice of the first user; identifying, by the at least one processor, respective recordings of voices of respective additional users who have joined the virtual meeting; generating, by the at least one processor, based on a first comparison of the first recording to a second recording of the respective recordings, a first similarity score indicative of a first similarity between the first voice of the first user and a second voice of a second user of the additional users; generating, by the at least one processor, based on a second comparison of the first recording to a third recording of the respective recordings, a second similarity score indicative of a second similarity between the first voice of the first user and a third voice of a third user of the additional users, the first similarity score less than the second similarity score; determining, by the at least one processor, based on the first similarity score and the second similarity score, a similarity loss for a virtual seating arrangement for which the first user and the second user are positioned with a distance between one another; determining, by the at least one processor, that the similarity loss is a minimum similarity loss of respective similarity losses for different virtual seating arrangements comprising the first user and the second user; generating, by the at least one processor, based on the determination that the similarity loss is the minimum similarity loss, presentation data for use with the spatial audio, the presentation data comprising a virtual representation of the first user and respective virtual representations of the additional users arranged based on the virtual seating arrangement; and causing presentation, by the at least one processor, of the presentation data.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for presenting video conferencing virtual seating arrangements with spatial audio, the method comprising:
    identifying, by at least one processor of a device, a request received from a first user to join a virtual meeting provided by a computer application, the virtual meeting using spatial audio;
    identifying, by the at least one processor, based on the request, a first recording of a first voice of the first user;
    identifying, by the at least one processor, respective recordings of voices of respective additional users who have joined the virtual meeting;
    generating, by the at least one processor, based on a first comparison of the first recording to a second recording of the respective recordings, a first similarity score indicative of a first similarity between the first voice of the first user and a second voice of a second user of the additional users;
    generating, by the at least one processor, based on a second comparison of the first recording to a third recording of the respective recordings, a second similarity score indicative of a second similarity between the first voice of the first user and a third voice of a third user of the additional users, the first similarity score less than the second similarity score;
    determining, by the at least one processor, based on the first similarity score and the second similarity score, a similarity loss for a virtual seating arrangement for which the first user and the second user are positioned with a distance between one another;
    determining, by the at least one processor, that the similarity loss is a minimum similarity loss of respective similarity losses for different virtual seating arrangements comprising the first user and the second user;
    generating, by the at least one processor, based on the determination that the similarity loss is the minimum similarity loss, presentation data for use with the spatial audio, the presentation data comprising a virtual representation of the first user and respective virtual representations of the additional users arranged based on the virtual seating arrangement; and
    causing presentation, by the at least one processor, of the presentation data.

2. The method of claim 1, further comprising:
    determining, based on a total number of users who have joined the virtual meeting, a second distance between a right-most virtual representation of a fifth user and a left-most virtual representation of a sixth user of the virtual seating arrangement; and
    determining, based on the second distance and the total number of users, an angle between each respective user of the total number of users of the virtual seating arrangement, wherein determining the similarity loss is further based on the angle.

3. The method of claim 1, wherein the first similarity score is a first cosine similarity score, and wherein the second similarity score is a second cosine similarity score.

4. The method of claim 3, further comprising:
generating a first vector embedding indicative of features of the first voice of the first user;
generating a second vector embedding indicative of features of the second voice of the second user; and
generating a third vector embedding indicative of features of the second voice of the third user,
wherein the first cosine similarity score is based on the first vector embedding and the second vector embedding, and the second cosine similarity score is based on the first vector embedding and the third vector embedding.

5. The method of claim 1, further comprising:
identifying a second request received from a fourth user to join the virtual meeting;
identifying, based on the second request, a fourth recording of a fourth voice of the fourth user;
generating, based on a third comparison of the first recording to the fourth recording, a third similarity score indicative of a third similarity between the first voice and the fourth voice;
determining, based on the first similarity score, the second similarity score, and the third similarity score, a second similarity loss for a second virtual seating arrangement for which the first user and the fourth user are positioned with a second distance between one another;
determining that the second similarity loss is a minimum similarity loss of respective similarity losses for different virtual seating arrangements comprising the first user, the second user, the third user, and the fourth user;
generating second presentation data for use with the spatial audio, the second presentation data comprising the virtual representation of the first user, a second virtual representation of the fourth user, and respective virtual representations of the additional users arranged based on the second virtual seating arrangement; and
causing presentation of the second presentation data.

6. The method of claim 5, wherein the virtual seating arrangement uses a third distance between a right-most virtual representation of a fifth user and a left-most virtual representation of a sixth user of the virtual seating arrangement, wherein the second virtual seating arrangement uses the third distance between the right-most virtual representation and the left-most virtual representation, and wherein the virtual representations of the users in the virtual seating arrangement are larger than the virtual representations of the users in the second virtual seating arrangement.

7. The method of claim 5, wherein the virtual seating arrangement uses a third distance between a right-most virtual representation of a fifth user and a left-most virtual representation of a sixth user of the virtual seating arrangement, wherein the second virtual seating arrangement uses a fourth distance between the right-most virtual representation and the left-most virtual representation, the fourth distance greater than the third distance, and wherein the virtual representations of the users in the virtual seating arrangement are a same size as the virtual representations of the users in the second virtual seating arrangement.

8. The method of claim 1, further comprising:
determining that the recording of the first voice is absent from a data storage of recordings;
generating the recording of the first voice based on the determination that the first voice is absent from the data storage; and
storing the recording of the first voice in the data storage.

9. A non-transitory computer-readable storage medium comprising instructions to cause processing circuitry of a device, upon execution of the instructions by the processing circuitry, to:
identify a request received from a first user to join a virtual meeting provided by a computer application, the virtual meeting using spatial audio;
identify, based on the request, a first recording of a first voice of the first user;
identify respective recordings of voices of respective additional users who have joined the virtual meeting;
generate, based on a first comparison of the first recording to a second recording of the respective recordings, a first similarity score indicative of a first similarity between the first voice of the first user and a second voice of a second user of the additional users;
generate, based on a second comparison of the first recording to a third recording of the respective recordings, a second similarity score indicative of a second similarity between the first voice of the first user and a third voice of a third user of the additional users, the first similarity score less than the second similarity score;
determine, based on the first similarity score and the second similarity score, a similarity loss for a virtual seating arrangement for which the first user and the second user are positioned with a distance between one another;
determine that the similarity loss is a minimum similarity loss of respective similarity losses for different virtual seating arrangements comprising the first user and the second user;
generate, based on the determination that the similarity loss is the minimum similarity loss, presentation data for use with the spatial audio, the presentation data comprising a virtual representation of the first user and respective virtual representations of the additional users arranged based on the virtual seating arrangement; and
cause presentation of the presentation data.

10. The non-transitory computer-readable storage medium of claim 9, wherein the instructions further cause the processing circuitry to:
determine, based on a total number of users who have joined the virtual meeting, a second distance between a right-most virtual representation of a fifth user and a left-most virtual representation of a sixth user of the virtual seating arrangement; and
determine, based on the second distance and the total number of users, an angle between each respective user of the total number of users of the virtual seating arrangement,
wherein to determine the similarity loss is further based on the angle.

11. The non-transitory computer-readable storage medium of claim 9, wherein the first similarity score is a first cosine similarity score, and wherein the second similarity score is a second cosine similarity score.

12. The non-transitory computer-readable storage medium of claim 11, wherein the instructions further cause the processing circuitry to:
generate a first vector embedding indicative of features of the first voice of the first user;

generate a second vector embedding indicative of features of the second voice of the second user; and generate a third vector embedding indicative of features of the second voice of the third user, wherein the first cosine similarity score is based on the first vector embedding and the second vector embedding, and the second cosine similarity score is based on the first vector embedding and the third vector embedding.

13. The non-transitory computer-readable storage medium of claim 9, wherein the instructions further cause the processing circuitry to:

identify a second request received from a fourth user to join the virtual meeting;

identify, based on the second request, a fourth recording of a fourth voice of the fourth user;

generate, based on a third comparison of the first recording to the fourth recording, a third similarity score indicative of a third similarity between the first voice and the fourth voice;

determine, based on the first similarity score, the second similarity score, and the third similarity score, a second similarity loss for a second virtual seating arrangement for which the first user and the fourth user are positioned with a second distance between one another;

determine that the second similarity loss is a minimum similarity loss of respective similarity losses for different virtual seating arrangements comprising the first user, the second user, the third user, and the fourth user;

generate, for the virtual meeting, second presentation data for use with the spatial audio, the second presentation data comprising the virtual representation of the first user, a second virtual representation of the fourth user, and respective virtual representations of the additional users arranged based on the second virtual seating arrangement; and cause presentation of the second presentation data.

14. The non-transitory computer-readable storage medium of claim 13, wherein the virtual seating arrangement uses a third distance between a right-most virtual representation of a fifth user and a left-most virtual representation of a sixth user of the virtual seating arrangement, wherein the second virtual seating arrangement uses the third distance between the right-most virtual representation and the left-most virtual representation, and wherein the virtual representations of the users in the virtual seating arrangement are larger than the virtual representations of the users in the second virtual seating arrangement.

15. The non-transitory computer-readable storage medium of claim 13, wherein the virtual seating arrangement uses a third distance between a right-most virtual representation of a fifth user and a left-most virtual representation of a sixth user of the virtual seating arrangement, wherein the second virtual seating arrangement uses a fourth distance between the right-most virtual representation and the left-most virtual representation, the fourth distance greater than the third distance, and wherein the virtual representations of the users in the virtual seating arrangement are a same size as the virtual representations of the users in the second virtual seating arrangement.

16. A device for presenting video conferencing virtual seating arrangements using spatial audio, the device comprising processing circuitry coupled to memory, the processing circuitry being configured to:

identify a request received from a first user to join a virtual meeting provided by a computer application, the virtual meeting using spatial audio;

identify, based on the request, a first recording of a first voice of the first user;

identify respective recordings of voices of respective additional users who have joined the virtual meeting;

generate, based on a first comparison of the first recording to a second recording of the respective recordings, a first similarity score indicative of a first similarity between the first voice of the first user and a second voice of a second user of the additional users;

generate, based on a second comparison of the first recording to a third recording of the respective recordings, a second similarity score indicative of a second similarity between the first voice of the first user and a third voice of a third user of the additional users, the first similarity score less than the second similarity score;

determine, based on the first similarity score and the second similarity score, a similarity loss for a virtual seating arrangement for which the first user and the second user are positioned with a distance between one another;

determine that the similarity loss is a minimum similarity loss of respective similarity losses for different virtual seating arrangements comprising the first user and the second user;

generate, based on the determination that the similarity loss is the minimum similarity loss, presentation data for use with the spatial audio, the presentation data comprising a virtual representation of the first user and respective virtual representations of the additional users arranged based on the virtual seating arrangement; and cause presentation of the presentation data.

17. The device of claim 16, wherein the processing circuitry is further configured to:

determine, based on a total number of users who have joined the virtual meeting, a second distance between a right-most virtual representation of a fifth user and a left-most virtual representation of a sixth user of the virtual seating arrangement; and determine, based on the second distance and the total number of users, an angle between each respective user of the total number of users of the virtual seating arrangement, wherein to determine the similarity loss is further based on the angle.

18. The device of claim 16, wherein the first similarity score is a first cosine similarity score, and wherein the second similarity score is a second cosine similarity score.

19. The device of claim 18, wherein the processing circuitry is further configured to:

generate a first vector embedding indicative of features of the first voice of the first user;

generate a second vector embedding indicative of features of the second voice of the second user; and generate a third vector embedding indicative of features of the second voice of the third user, wherein the first cosine similarity score is based on the first vector embedding and the second vector embedding, and the second cosine similarity score is based on the first vector embedding and the third vector embedding.

20. The device of claim 16, wherein the processing circuitry is further configured to:

identify a second request received from a fourth user to join the virtual meeting;

identify, based on the second request, a fourth recording of a fourth voice of the fourth user;
generate, based on a third comparison of the first recording to the fourth recording, a third similarity score indicative of a third similarity between the first voice and the fourth voice;
determine, based on the first similarity score, the second similarity score, and the third similarity score, a second similarity loss for a second virtual seating arrangement for which the first user and the fourth user are positioned with a second distance between one another;
determine that the second similarity loss is a minimum similarity loss of respective similarity losses for different virtual seating arrangements comprising the first user, the second user, the third user, and the fourth user;
generate, for the virtual meeting, second presentation data for use with the spatial audio, the second presentation data comprising the virtual representation of the first user, a second virtual representation of the fourth user, and respective virtual representations of the additional users arranged based on the second virtual seating arrangement; and
cause presentation of the second presentation data.

* * * * *